United States Patent [19]  
Baron

[11] 4,084,890  
[45] * Apr. 18, 1978

[54] CONTACT LENS

[76] Inventor: Henry J. Baron, 52 S. Oakland Ave., Sharon, Pa. 16146

[*] Notice: The portion of the term of this patent subsequent to Oct. 17, 1989, has been disclaimed.

[21] Appl. No.: 575,139

[22] Filed: May 7, 1975

Related U.S. Application Data

[63] Continuation of Ser. No. 278,067, Aug. 4, 1972, abandoned, which is a continuation of Ser. No. 888,293, Dec. 29, 1969, Pat. No. 3,698,802, which is a continuation-in-part of Ser. No. 687,240, Dec. 1, 1967, abandoned, and a continuation-in-part of Ser. No. 736,124, Jun. 11, 1968, abandoned, and a continuation-in-part of Ser. No. 736,149, Jun. 11, 1968, abandoned.

[51] Int. Cl.² .............................................. G02C 7/04
[52] U.S. Cl. .................................................. 351/160
[58] Field of Search ................................ 351/160–162

[56] References Cited

U.S. PATENT DOCUMENTS

| 2,241,415 | 5/1941 | Moulton | 351/160 X |
| 2,544,246 | 3/1951 | Butterfield | 351/160 |
| 3,660,545 | 5/1972 | Wichterle | 351/160 X |
| 3,698,802 | 10/1972 | Baron | 351/160 |

OTHER PUBLICATIONS

Mandell, Article in "Journal of the American Optometric Assoc.," July 1968, pp. 641 & 642.
Minisculent Contact Lens Advertisement in "Optical Journal & Review of Optometry," Mar. 15, 1961, pp. 30 & 31.
Morrison, Article in "Journal of the American Optometric Assoc.," Mar. 1966, pp. 211–218.

Primary Examiner—Conrad J. Clark

[57] ABSTRACT

A contact lens formed from a soft, flexible, hydrophilic, cross-linked polymeric material. The lens has a centrally located optical zone and an outer peripheral portion that has its maximum thickness intermediate the juncture of that portion with the optical zone and the thin edge of the lens.

6 Claims, 8 Drawing Figures

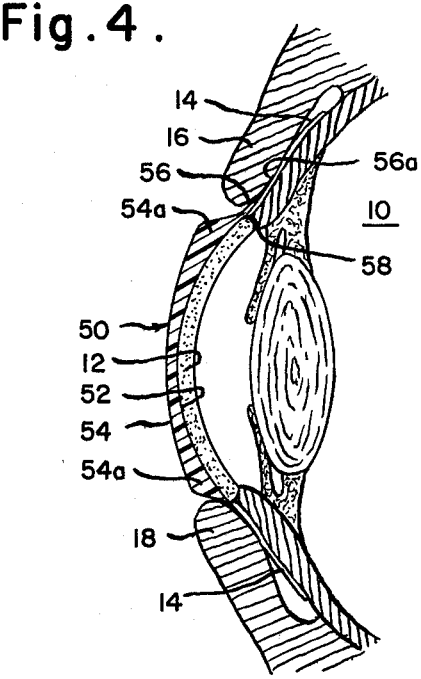
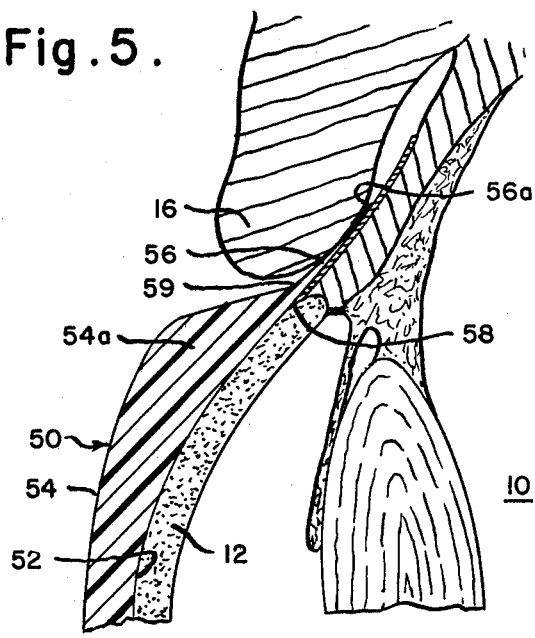

CONTACT LENS

This application is a continuation of my Application Ser. No. 278,067, filed Aug. 4, 1972 and now abandoned, which was a continuation of my copending Application Ser. No. 888,293, filed Dec. 29, 1969 and issued as U.S. Pat. No. 3,698,802. The last-named application was a continuation-in-part of my Applications Ser. No. 687,240 filed Dec. 1, 1967 and now abandoned, Ser. No. 736,124 filed June 11, 1968 and now abandoned, and Ser. No. 736,149 filed June 11, 1968 and now abandoned.

This invention relates to a contact lens; more particularly to a contact lens formed from a hydrophilic polymeric material and having a configuration which permits it to be fitted to the human eye for the correction of vision.

The contact lens art is an old one, dating back to the time of Leonardo da Vinci. The primary purpose of the early lenses was to neutralize the effects of the cornea upon human vision. Although other uses for contact lens have evolved, for example, as a protective device, workers in the art are still concerned with fitting an artificial material against the human tissue of the cornea to achieve better visual acuity and minimize the discomfort experienced by the wearer.

The early contact lenses were formed from optical glass and were never successful because they caused discomfort to the wearer and were incompatible with human tissue. Later, contact lenses were made from hard acrylic plastics, usually polymethyl methacrylate. However, it was found that the eye underwent physiological changes as a result of contact with the hard lenses; for example, the curvature of the cornea often changed; an increase in fluid contact of the cornea, called edema, was experienced; and the nature of the corneal tissue changed allowing fluorescein dye to penetrate the cornea and cause it to exhibit a stain. Moreover, the adverse physiological effects of the hard lenses sometimes caused the wearer to have blurred vision with his spectacles and to experience difficulty in alternating between spectacles and contact lenses. Another source of discomfort was the tendency of dust and other foreign matter to collect beneath the hard lens and cause eye irritation. Vision with the hard acrylic lenses was generally good; however, one of the common problems associated with hard acrylic lenses was that patients were disturbed by reflections and flair from the peripheral part of their visual field.

More recently, contact lenses have been fabricated from soft hydrophilic polymeric materials. The material used in the manufacture of these lenses is 2-hydroxyethyl methacrylate. The polymer consists of a 3-dimensional network of hydroxyethyl methacrylate chains cross-linked occasionally with diester molecules approximately one every 200 monomer units. Examples of these materials and their methods of manufacture may be found in U.S. Pat. Nos. 2,979,578 and 3,220,960. The property which makes these gel-like materials particularly useful in contact lenses is their ability to absorb water with a concomitant swelling to a soft mass of extremely good mechanical strength, complete transparency, and the ability to retain shape and dimensions. When equilibrated in a given fluid, the lenses elastically recover this shape after deformations exceeding 100%. It is noteworthy that, although the lenses contain water, there is no significant exchange of fluid and nutrients through the lenses; this exchange results from tear flow and other means.

For convenience, I shall hereinafter refer to lenses formed from soft hydrophilic polymeric materials of the type just described as "soft lenses".

Soft lenses are highly compatible with human corneal tissue and minimize physiological effects; however, workers in the art have experienced difficulty in achieving satisfactory vision with the lenses. The common fitting procedure for soft lenses has been based on techniques well-established for hard acrylic lenses; namely, that since it is known that the corneal surface is generally aspheric, either a parabola or an ellipse, the lens should be fabricated so that the inside surface of the lens matches the wearer's corneal surface. A perfect match rarely occurs because there is no precise method for measuring the overall curvature of the human cornea. Thus, the actual curvature of the inside surface of the lens when it is in position in the human eye is a function of the curvature of the cornea and the curvature imparted to the lens as it shapes itself to conform to the corneal surface. Any change in curvature of the inside surface of a soft lens is, by reason of the nature of the soft material, transmitted to the outside surface causing a corresponding change in curvature of the latter.

Thus, for example, soft lenses fabricated in accordance with known casting methods commonly have an aspheric inner (concave) surface and a spherical front or outer (convex) surface. When fitted upon a human cornea, the established curvature of the inside surface changes causing the outside surface, originally spherical, to become aspherical. Poor vision usually results because the change in curvature produces aberrations to the peripheral vision or visual performance distinctly different from that of the eye itself.

Another problem associated with known soft lens configurations is that sufficient adherence between the lens and the cornea is not achieved. I have observed that this adherence is greater where the lens material is thicker than where the lens is thinner. Typically, the known soft lenses have a thick central portion, tapering to a thin edge. In position on the cornea, this lens is repeatedly pushed downwardly by the action of the upper eyelid on each blink. Since the edge of the lens is flexible, it bends at the lower limbus and rides onto the lower sclera and eventually rests in a low position with the resultant vision being poor. Therefore, the corrective measures have been to increase the curvature of the lens, i.e., make the curvature "steeper"; as a result, the lens tends to center on the cornea. However, the increase in curvature results in the lens being in contact with the cornea only at the peripheral region of the lens, thereby forming a space between the central portion of the inner surface of the lens and the front surface of the cornea. Each time a blink occurs, the central portion of the lens flexes or folds; as the upper lid retracts, the central portion of the lens assumes its original shape. Thus, continual changes in vision result from normal blinking when the curvature of the lens is steepened. Only rarely does the upper eyelid of an individual exert so little pressure on the lens that a lens of standard configuration, i.e., having a thick central portion, remain centered without being too steeply curved.

I have discovered a lens configuration which overcomes the problems associated with existing soft lenses and enables the wearer to retain the lens comfortably and with good visual acuity. My lens design causes the lens to center on the cornea regardless of the magnitude of the muscle tension exerted by the upper lid. Moreover, my lens achieves a proper match between its curvature and the curvature of the cornea thereby providing continuingly good vision, unchanging with each blink.

I provide a corneal contact lens adapted to adhere to the cornea while at the same time maintaining good visual acuity, said lens being fabricated from a gel-like crosslinked hydrophilic polymeric material; said lens having a generally spherical concave inner surface which conforms to the curved surface of the cornea when positioned thereon, and an outer peripheral surface portion tapering from a thin edge to an intermediate point of maximum thickness and then tapering to the center of the lens. I further provide that said peripheral surface portion is generally wedge shaped in cross section or, alternatively, has a convex bead shaped cross-section shape having the maximum thickness in the center thereof. Preferably, the peripheral surface portion has a maximum thickness section thereof greater than a remainder of the lens. Also, I preferably provide that the intermediate point of said peripheral surface portion is about 1.5 millimeters (mm.) from the edge of the lens.

In one embodiment of the present invention, I provide a lens as recited above wherein said lens has an outer surface ground with a necessary astigmatism correction.

In the same embodiment, I provide that the lens may have an additional mass of material at a lower portion thereof in an amount sufficient to aid in the adherence of said lens to the cornea.

In all embodiments of the present invention, I provide that the lens may have indexing means in a lower position of said lens for providing an oriented reference for fitting said lens on the cornea.

I further provide a contact lens for use on a human eye formed from a gel-like cross-linked polymeric refractive material and of a size to extend beyond the area defined by the limbus, said lens having a concave inner surface which conforms to the surface of and adheres to a portion of the curved surface of the cornea on which it rests, and an outer peripheral surface portion tapering from a thin edge to an intermediate point of maximum thickness and then tapering to the center of the lens. In this form of the invention, I prefer that the diameter of the lens is between about 0.5 millimeters and 3.0 millimeters larger than the average diameter of the cornea on which said lens is fitted; and that said intermediate point of maximum thickness lies substantially adjacent the edge of the cornea of the eye on which the lens is fitted.

Other details, objects and advantages of the invention will become apparent as the following description of certain preferred embodiments thereof proceeds.

The accompanying drawings, I have shown certain present preferred embodiments of the invention in which:

FIG. 4 is an enlarged view of a vertical section of a portion of a human eye illustrating a contact lens embodying the present invention fitted on the cornea and part of the sclera thereof;

FIG. 5 is an enlarged sectional view through the center of the contact lens of FIG. 4 showing further details of construction;

Figure 1:
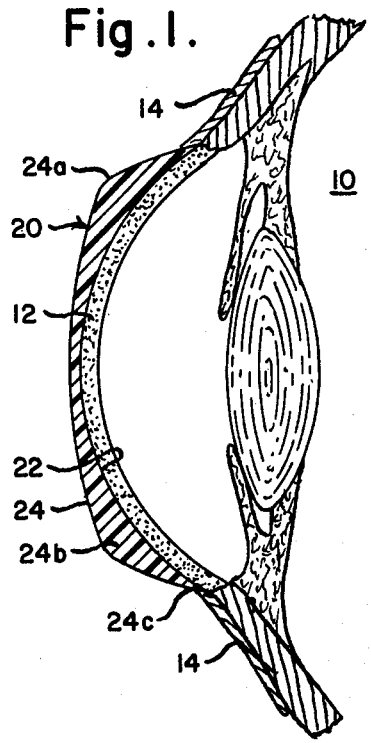
FIG. 1 is an enlarged sectional view through the center of a portion of a human eye illustrating a corneal contact lens in one embodiment of the present invention fitted on the cornea thereof.

Referring to the drawings and in particular FIG. 1, the reference numeral 10 indicates in general a human eye with the cornea thereof generally indicated as 12 and the sclera as 14. A contact lens of the corneal type embodying the present invention is generally represented as 20. Lens 20 is formed from a suitable hydrophilic material such as described hereinabove. Lens 20 has two primary surfaces, inner surface 22 and outer surface 24, both of which are spherical. Surface 22 is concave and is shown resting on the surface and conforming to the shape of the cornea 12. Surface 24 is convex, abruptly changing in radius at peripheral region 24a. Accordingly, region 24a defines an annular peripheral region having a maximum thickened portion 24b tapering outwardly to a knife edge 24c. Thus, the peripheral region 24a provides the thickest portion of the lens 20 and thereby gives the lens the greatest adhering capability at region 24a. By making the peripheral region 24a the region of maximum adherence, the lens 20 will remain in a fixed position on the cornea 12. Furthermore, lens 20 need not be steeply curved to insure good adherence to the cornea 12.

Preferably, lens 20 has a diameter approximately equal to the diameter of the cornea 12. For example, the average diameter is 12.0 mm. but a small eye may require a smaller lens, say 11.5 mm. and a larger eye, a larger lens, say 12.5 to 13.0 mm. Preferably, the peripheral region 24a of lens 20 has a thickness of about 0.28 mm. and the point of maximum thickness is preferably located about 1.5 mm. in from the edge 24c of lens 20. All of the foregoing measurements apply to a lens in its soft state. As stated above, lens 20 is tapered from the thickened peripheral region 24b to a knife edge 24c. By way of example, a typical minus power lens would have a thickness in the central region of about 0.18 mm.

Preferably, the radius of curvature of the inner surface 22 of lens 20 is between about 7.60 and 8.20 mm. The radius of curvature will vary, of course, with the tensile strength of the hydrophilic material and the curvature of the wearer's eye. In the case where a lens material is of relatively low tensile strength, the radius of curvature of the inner surface 22 must be steeper to maintain proper adherence. The proper curvature for any given eye can be readily determined by testing a series of lenses of differing curvature and adopting the lens having the steepest curvature that permits the lens material to stretch out and shape itself to the cornea and maintain that shape.

As is well known, the good visual acuity of lens 20 results from the use of two spherical surfaces 22 and 24. Surface 22 reshapes itself to an aspheric surface to match the surface of the cornea 12 it is resting on. Surface 24 accordingly changes its shape and also conforms with the shape of the cornea 12. Thus, optical performance of lens 20 becomes very much the same as that created by the front surface of the cornea itself. Surface 24 also provides the change in curvature necessary to correct the refraction of the eye. Use of lens 20, thus, results in excellent vision which is free from any peripheral disturbance.

Figure 2:
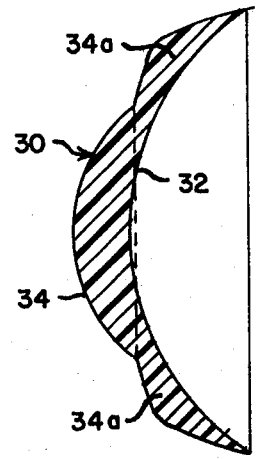
FIG. 2 is a view similar to that of FIG. 1 showing another embodiment of the present invention.
Figure 3:
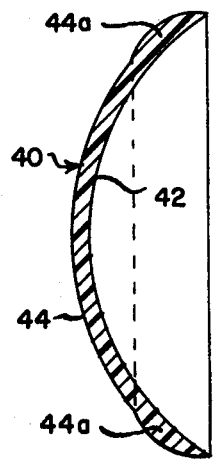
FIG. 3 is a view similar to FIGS. 1 and 2 showing yet another embodiment of the present invention.

Other embodiments of the present invention are illustrated in FIGS. 2 and 3. Lens 30 of FIG. 2 is a familiar contact lens with plus power. Inner surface 32 and outer surface 34 are spherical while region 34a is thickened in the same manner as region 24b of FIG. 1. Lens 30 has excellent optical characteristics and good adherence capabilities for the same reasons as stated herein in relation to lens 20 of FIG. 1. FIG. 3 shows a lens 40 having spherical inner and outer surfaces 42 and 44, respectively, and being provided with an annular thickened peripheral region 44a having a bead shaped cross-section.

The lenses illustrated in FIGS. 1–3 are of the corneal type, that is, of a diameter which is approximately equal to or less than the diameter of the cornea on which the lens is fitted. I have found that improved adherence may be achieved in lenses of the scleral type; that is, of a diameter which is larger than the cornea on which the lens is fitted so that the lens extends beyond the area defined by the limbus. Lenses of this type are shown in FIGS. 4 and 5 to have the typical convex outer and concave inner surfaces. The inner surface has a portion generally conforming to and adhering to the curved surface of the cornea. The peripheral portion of the lens has a thickened portion which, together with the increased diameter of the lens, acts to achieve a high degree of adherence between the lens and the eye.

Referring to FIGS. 4 and 5, the reference numeral 10 again generally represents a human eye with the cornea thereof generally indicated as 12 and the sclera as 14. The upper eye lid is indicated as 16 and the lower eye lid is indicated as 18. A soft contact lens embodying the present invention is generally represented as 50. Lens 50 has two primary surfaces, namely inner surfaces 52 and outer surface 54, both of which are spherical although not clearly shown as such. Inner surface 52 is concave and conforms to, as well as adheres to the surface of cornea 12 and portions of sclera 14. Like the corneal lenses 20, 30 and 40, lens 50 has a thickened peripheral region 54a which is the region of maximum adherence of lens 50 to the cornea 12.

Lens 50 is provided with a thin edge portion 56 which circumscribes the entire lens. The edge section 56 begins at the limbus 58 of the eye 10 and extends to the remote edge of the lens 50. By forming edge section 56 in this fashion, there will be no eyelid action from either upper eyelid 16 or lower eyelid 18 on edge section 56 and also minimal or no force will be exerted on the blood vessels of sclera 14 and conjunctiva. Edge section 56 should be sufficiently thick enough to maintain proper strength and comfort while at the same time being thin enough so as to avoid any action thereon by the eyelids. I have found that I can achieve these mentioned characteristics of edge section 56 by making its dimension at its juncture with thickened portion 54a, designated as 59, between approximately 0.10 mm and 0.15 mm and tapering the section 56 therefrom to a knife edge 56a.

Lens 50 extends below the lower lid margin of the eye with the result that the lower lid 14 cannot adversely affect the positioning of lens 50 by pushing it up. Similarly, lens 50 fits under the upper lid 16 and therefore cannot be displaced by the action of the upper lid 16 on the lens 50.

I have found that improved adherence characteristics achieved by the present invention are further enhanced by the so-called "scleral lens" configuration shown in FIGS. 4 and 5. The geometrical projection of lens 50 has a diameter which is larger than the diameter of the geometrical projection of cornea 12. That is, lens 50 is larger than the cornea 12 and extends below the margin of the lower eyelid 18 and above the margin of upper eyelid 16. It has been found by use that lens 50 adheres to the eye of the user sufficiently to retain the lens in its proper position on the cornea and that continuous use will not result in any appreciable displacement of the lens. That is, lens 50 will not be shifted by action of the eyelids on the lens. In order to have the improved adherence characteristics as indicated hereinabove, I have found that the diameter of the geometrical projection of lens 50 should be anywhere from 0.5 mm to 3.0 mm greater than the diameter of the projection of the cornea. The exact size of a lens will depend upon the nature and size of the eye of the ultimate user of my improved lens.

By being larger than the cornea 12, the inner surface 52 of lens 50 has curvature which is defined by a curve whose chord diameter and sagittal depth approximate the chord diameter and sagittal depth, respectively, of the combined corneal-scleral region on which the lens 50 is fitted. This configuration results in a lens having less steep curvature than a lens of smaller diameter but having equally good adherence characteristics.

Figure 6:
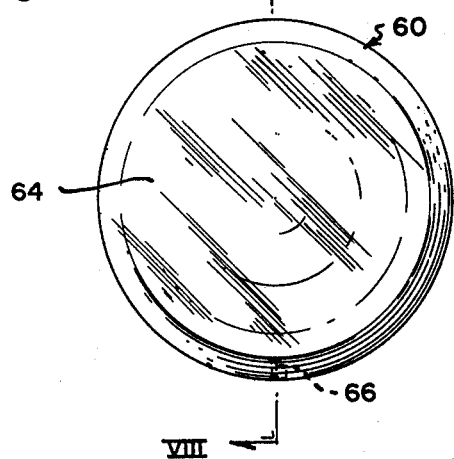
FIG. 6 is an enlarged front view in elevation of an astigmatic contact lens showing one lens orientation feature applicable to all embodiments.
Figure 7:
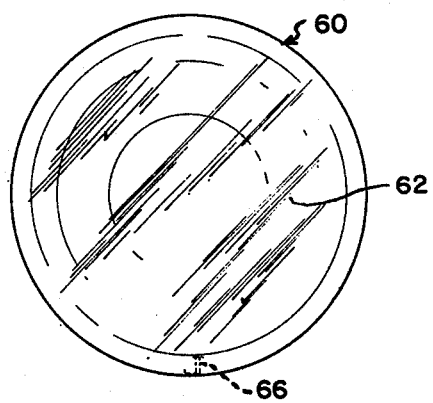
FIG. 7 is an enlarged rear view in elevation of the lens of FIG. 6.
Figure 8:
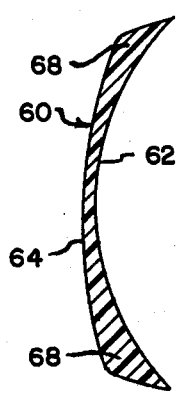
FIG. 8 is a sectional view taken along the line VIII—VIII of FIG. 6.

The present invention is also highly useful for lenses into which astigmatism corrections are ground. FIGS. 6–8 illustrate the invention embodied in such lenses and are described in detail hereinbelow.

As is well known, astigmatism is a condition of the eye where the surface of the cornea has two different radii of curvature, much like a football, for example. Because astigmatism lenses correct two different radii of curvature of the cornea any shift or rotation of the lens would upset the astigmatism correction. The adherence achieved by the thickened peripheral region of the present invention prevents shifting or rotation of the lens.

My preferred lens has the outer surface thereof ground to correct the astigmatism while the inner surface conforms to the astigmatic cornea. The inner surface of another embodiment of my lens is ground to correct the astigmatism while the outer surface is spherical and is especially adapted to correct higher degrees of astigmatism. I also provide, as subsidiary features in all my embodiments, improvements for orienting the position of my lens.

Referring again to the drawings and in particular to FIGS. 6, 7 and 8, the reference numeral 60 represents a soft lens embodying the present invention. Lens 60 is an astigmatic lens, that is, it is suitably ground in a manner to be described hereinafter to correct an astigmatism condition. Although not shown specifically in FIGS. 6 and 7, lens 60 has an inner concave shaped surface 62 and an outer convex surface 64 similar to surfaces 22 and 24 respectively shown in FIG. 1.

In fitting lens 60 to a human cornea, the inner surface 62 (for the purposes of the immediate discussion, not having an astigmatic correction ground thereon) conforms and adheres to the astigmatic surface of the cornea in the manner described above for all embodiments of the present invention. Accordingly, the inner surface 62 of itself does not eliminate the refractive error caused by the astigmatism. However, the outer surface 64 is ground and polished with the astigmatism correction. The astigmatism correction of outer surface 64 is shown diagrammatically in FIG. 6. Since lens 60 is correcting for two different radii of curvature, characteristic of astigmatism, it is vitally important that the lens is properly oriented with respect to the cornea on which it is fitted. To accomplish proper orientation, lens 60 is provided with an index 66 at its six o'clock position which index 66 serves as an orientation reference for the user. Accordingly, the user will orient the lens 60 with the index 66 at the six o'clock position and then place the lens on his cornea or rotate the lens until the index 66 is at six o'clock with respect to his cornea. For determining the proper lens for the proper eye it would be convenient to scribe an L, as shown, for index 66 to indicate that the lens is for the left eye, and an R to indicate that the lens is for the right eye.

In the case of higher degrees of astigmatism, more than two diopters, lens 60 may be formed with the inner surface 62 ground to match the amount of astigmatism on the cornea while the outer surface 64 is spherical. The indexing feature just described may be used similarly on this lens configuration.

If it is found that the upper lid of a user of lens 60 exerts an extraordinary force against the lens, which force would tend to shift the lens, additional adherence can be created by adding weight to lens 60 at the six o'clock position thereof. As shown in FIG. 8, lens 60 has an increased thickness of material, designated 68, which is generally semi-ring-shaped as viewed in plan and wedge-shaped in cross-section as shown in FIG. 8. Additional adherence of either lens 60 on a cornea may be provided as described above by increasing the overall diameter of the respective lens so that it extends one or two millimeters, for example, beyond the limbus of the eye.

I claim:

1. A contact lens adapted to be positioned adjacent the cornea while at the same time maintaining good visual acuity, said lens being formed from a transparent, soft, flexible, hydrophilic, cross-linked polymeric material and having an outer surface and a concave inner surface that conforms generally to that surface of the cornea adjacent to which it is located, said lens having a centrally located optical zone and a peripheral portion extending outwardly from said optical zone and terminating in a relatively thin edge of the lens, the juncture of said optical zone and said peripheral portion being defined by a visually apparent change in the shape of said outer surface of said optical zone at said juncture, said peripheral portion having a region intermediate said edge and said juncture, said region being thicker than at said edge or said juncture.

2. A contact lens as claimed in claim 1, in which said peripheral portion tapers from its region of maximum thickness toward said edge and toward said juncture with said optical zone.

3. A contact lens as claimed in claim 1, in which said peripheral portion tapers uniformly from said region of maximum thickness toward said edge and said juncture with said optical zone.

4. A contact lens as claimed in claim 1, in which said peripheral portion decreases in thickness from said region of maximum thickness toward said edge first at a relatively rapid rate and at a substantially lesser rate thereafter to form an edge section adapted to extend under the eyelid of the wearer.

5. A contact lens as claimed in claim 1, in which said peripheral portion has an outer surface curved convexly at said region of maximum thickness and, at locations spaced from said region of maximum thickness, being bounded by areas substantially linear in cross-section extending toward said edge and toward said juncture of said peripheral portion and said optical zone.

6. A contact lens as claimed in claim 1, in which said region of maximum thickness of said peripheral portion is located substantially equidistant from said juncture with said optical zone and said thin edge of the lens.

* * * * *